Figure 1:
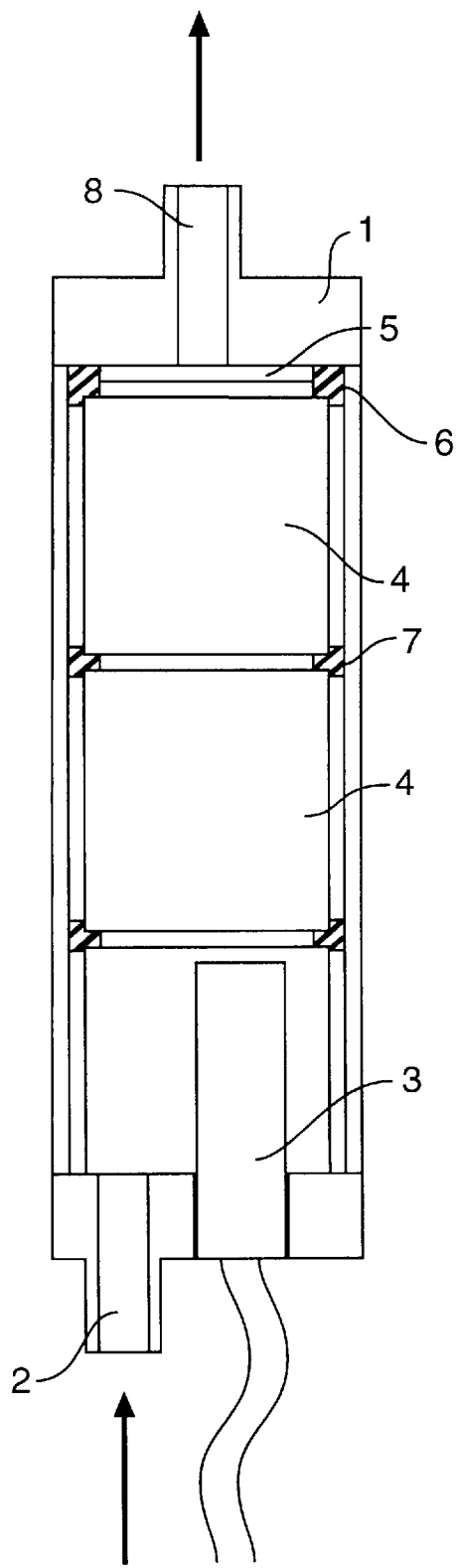

United States Patent
Koch et al.

[11] Patent Number: 5,816,225
[45] Date of Patent: Oct. 6, 1998

[54] DEVICE FOR THE TREATMENT OF ENGINE AND HEATING FUELS OBTAINED FROM MINERAL OIL OR FROM PLANTS

[75] Inventors: Christian Koch, Buttenheim; Georg Götzelmann, Stuttgart; Jürgen Sterzik, Bamberg, all of Germany

[73] Assignee: I.A.T. Technologies Limited, Dublin, Ireland

[21] Appl. No.: 738,526

[22] Filed: Oct. 28, 1996

[30] Foreign Application Priority Data

May 14, 1996 [DE] Germany .................. 196 19 454.7

[51] Int. Cl.$^6$ .................................................. F02M 33/00
[52] U.S. Cl. ........................................... 123/538; 123/557
[58] Field of Search ..................... 123/536, 537, 123/538, 539, 557, 545, 546, 547, 549

[56] References Cited

U.S. PATENT DOCUMENTS

| | | | |
|---|---|---|---|
| 4,429,665 | 2/1984 | Brown | 123/538 |
| 4,517,926 | 5/1985 | Reinhard et al. | |
| 4,715,325 | 12/1987 | Walker | 123/538 |
| 4,876,989 | 10/1989 | Karpuk et al. | |
| 5,092,303 | 3/1992 | Brown | 123/538 |
| 5,167,782 | 12/1992 | Marlow | 123/538 |
| 5,305,725 | 4/1994 | Marlow | 123/538 |
| 5,524,594 | 6/1996 | D'Alessandro | 123/538 |

FOREIGN PATENT DOCUMENTS

| | | |
|---|---|---|
| 91 03 500.7 | 9/1991 | Germany . |
| 42 13 808 A1 | 10/1993 | Germany . |

OTHER PUBLICATIONS

Patent Abstracts of Japan, Publication No. 58122984, Publication Date Jul. 21, 1983, Kenji et al.

Primary Examiner—Marguerite McMahon
Attorney, Agent, or Firm—Larson & Taylor

[57] ABSTRACT

The device is used for treating engine and heating fuels obtained from mineral oil or plants. It has a heating device (3) for heating the liquid engine or heating fuel and a reactor (1) containing at least one reactor element (4) which consists at least partially of a tin alloy on the surface. This tin alloy contains 0.2 to 20 weight-% of copper as the alloy element with the greatest proportion by weight added to the tin. The reactor element consists of a plurality of loose or connected granules of a transverse dimension of at most 5 mm.

28 Claims, 3 Drawing Sheets

DEVICE FOR THE TREATMENT OF ENGINE AND HEATING FUELS OBTAINED FROM MINERAL OIL OR FROM PLANTS

The invention relates to a device for the treatment of engine and heating fuels obtained from mineral oil or plants, having a heating device for heating them and a reactor through which a flow can pass and containing at least one reactor element which consists at least partially of a tin alloy on the surface.

It is known that it is possible to improve the combustion properties of liquid heating and engine fuels by forming ignition nuclei, which ensure a more even combustion process and thus the reduction of nitric oxide expulsion and of the carbon monoxide portion in the exhaust gas and, in connection with Diesel fuel, the reduction of the soot formation. For this purpose, additives are mixed in with the heating or engine fuels during their production or when filling the tank. Alternatively it is also possible to admix the additives to the fuel or the combustion air from a separate tank via a metering device. It is disadvantageous in connection with this method that the additives are expensive and in many cases also poisonous. The latter is the case mainly in connection with particularly effective organometallic substances. It is therefore not possible without danger to provide an additive to the heating or engine fuel or to dispense it as a concentrate for filling in tanks, because these poisonous materials would have to be produced and sold in a concentrated form.

A device of the above species is also already known, whose reactor elements consisted of large granules of a transverse dimension of approximately 25 mm made of a tin alloy, which contained mercury, lead and antimony as alloy elements. Although it was possible by means of this to positively affect the combustion progress, a broad application of such a device in motor vehicles and heating installations is not possible, because part of the poisonous components of the reactor reach the atmosphere through the exhaust gases.

It is therefore the object of the invention to provide a device of the type mentioned at the outset, which, in respect to the improvement of the combustion properties, leads to results comparable with the last mentioned device, but pollutes the environments considerably less and is less injurious to health even with broader application, so that with an optimal design practically no negative effects occur for the environment and health.

The above object is attained in accordance with the invention in that the tin alloy on the surface of the reactor element contains 0.2 to 20 weight-% of copper as the alloy element with the largest proportion by weight added to the tin, and that the reactor element consists of a plurality of granules which are loose or attached to each other and have a diameter of at most 5 mm. Except for the usual impurities, the tin alloy at the surface of the reactor element preferably exclusively contains copper in a proportion within the cited limits. Particularly good results can be achieved in this case if the proportion of copper amounts to approximately 2 to 8 weight-% of the tin alloy on the surface of the reactor element. A copper proportion of approximately 4 to 5 weight-% has been shown to be optimal in tests up to now.

While the increase in efficiency of the engines and the improvement of the exhaust gases can be easily measured when using a device in accordance with the invention, the consumption of reactor material is so small, that so far it was not possible to quantify it with the available measuring devices. In this case the fact must be taken into consideration that in actual operations components of the engine or heating fuel are deposited on the reactor. In any case, the possible time of use of the proposed reactor exceeds the service life of a motor vehicle engine, so that an exchange is not necessary.

The fact alone that the consumption of reactor material is so low that it can practically not be measured, and in addition the fact that these are only the easily tolerated elements tin and copper, show that even with broad employment of the proposed device it is not necessary to accept harmful side effects for the ecologically advantageous effects of the reduction of the heating and engine fuel consumption and the improvement of the exhaust gases. However, it is essential in connection with the desired positive effect, that the engine or heating fuel is heated prior to flowing through the reactor, and that the effective surface of the reactor element is as large as possible. In connection with the invention it is therefore provided that the granules constituting the reactor element have a transverse dimension, i.e. with round granules a diameter, which is 5 mm at most.

If the reactor element is provided in loose bulk fill of the granules, which preferable have a largest transverse dimension of approximately 1 to 5 mm, it is practical to place them into a can, whose end walls are constituted by screens with a mesh width which is less than the largest transverse measurement of the smallest granules. It is possible to prefabricate and store the reactor element and to handle it as one component during assembly. In the preferred practical embodiment an inner screen with a relatively greater mesh width and an outer screen with a relatively finer mesh width are disposed on at lest one end of the can. In order to assure that the engine or heating fuel flows through the bulk granules, it is recommended to insert the can into an outer housing of the reactor by means of at least one seal ring enclosing its circumference.

In an alternative practical embodiment, the reactor element consists of granules of a greatest transverse dimension of 0.05 to 1 mm, which have been sintered together to form a block. Since in this case it would be difficult to sinter such small homogeneous granules with only a comparatively small proportion of copper in such a way, that the metal does does run together in places to form large masses, but instead the hollow spaces between the small grains remain intact to the greatest possible degree, it is provided in a further advantageous embodiment of the invention for the granules to have an inner core of copper, on which a layer of tin is placed, for example by vacuum evaporation, at the same time forming an alloy. Even with this production method it is necessary to take care that not too much tin is applied by vacuum evaporation in order to avoid the mentioned running together. In addition, a surface of the reactor purely ot tin would not be as effective as the above recited tin alloy.

Although so far the effective mechanism of the reactor has not yet been fathomed, presumably there is a connection between the amount of the organo-tin compounds, formed in the course of the flow through the reactor by chemical reactions, leading to the attachment of tin atoms to hydrocarbon molecules of the heating and engine fuel, and the melting temperature of the tin alloy which, with a copper proportion of 4 to 5%, is optimally low and increases with a higher copper proportion as well as with a tin proportion higher than 95 to 96%.

To obtain a reactor element, in particular a sinter block, with a surface of an effective tin-copper alloy, the granules can also have an inner core of tin oxide and copper oxide. It is possible in this case to obtain a surface layer of the recited tin-copper alloy by reducing the surface of the granules in a hydrogen flow and to produce the alloy by heating past the melting point of the reduced surface layer.

The heating device provided in accordance with the invention preferably contains positive temperature coefficient (PCT) heating elements for heating the engine and heating fuels. It has been found that success was all the greater, the higher the temperature of the engine and heating fuel can be in the reactors taking into consideration in individual cases the marginal conditions there, such as the avoidance of gas bubbles, maintaining the lubricating capability, etc. The PTC heating elements are suitably disposed upstream of the reactor in the liquid flow, so that the engine or heating fuel already has the optimally high temperature when entering the reactor. If the device in accordance with the invention is a part of the fuel line and is disposed upstream of an injection pump or a carburetor, the heating device will be designed in the normal case for heating the engine fuel prior to entry into the reactor to approximately 40° to 80° C. in case of gasoline, or 50° to 200° C. in case of Diesel oil. In this case it is recommended to attach an engine fuel filter upstream of the heating device in the direction of flow, but in any case upstream of the reactor. It has been found that a fuel filter disposed downstream of the reactor results in a reduction in the reactor effect. This negative effect can possibly be the result of a chemical reaction of the treated engine fuel with deposits in the filter. On account of further chemical reactions of the treated engine fuel, which over time weaken the effects of the treatment, it has also been found useful to bring the fuel to combustion directly following treatment, instead of treating it when it is produced and then to store it for an extended time in the treated state.

In the course of further research it has been surprisingly found that it was possible to make so-called bio-oils, which up to now were not suitable for producing engine or heating fuels, into such fuels by means of the device in accordance with the invention. The device in accordance with the invention for this purpose has a catalyzer upstream of the reactor in the flow direction, which preferably is disposed between the heating device and the reactor and is provided with a further heating device, by means of which it is heated to approximately 400° C. during operation. The catalyzer can consist, for example, of a honeycomb-shaped support body of cordierite, through which fuel can flow and which is coated with a suitable catalytic material, for example $LaCoO_3$. A cracking process takes place in the catalyzer at the stated temperature, in which the long molecular chains of the bio-oil are converted into shorter chain hydrocarbons, whose combustion properties are subsequently improved by the treatment in the reactor proposed by the invention in such a way, that the end product of the treatment can be used as an engine or heating fuel immediately afterwards.

A particular advantage of the proposed arrangement of the catalyzer and the reactor behind each other in the flow direction lies in that the heating of the bio-oil in the catalyzer necessary for cracking can simultaneously be used also for the treatment in the reactor. Since the temperature required in the catalyzer is considerably higher than the temperature used for the reactor, in a preferred embodiment a heat exchanger is arranged in the engine or heating fuel line downstream of the catalyzer and/or downstream of the reactor in the flow direction, through which the engine or heating fuel, which already has been treated in the catalyzer on the one hand and which, on the other hand, is still to be treated in the catalyzer, flows. At least one of the heat exchangers is suitably provided with a steam separator, which is connected to an air aspirating line of the burner or the engine.

Figure 2:
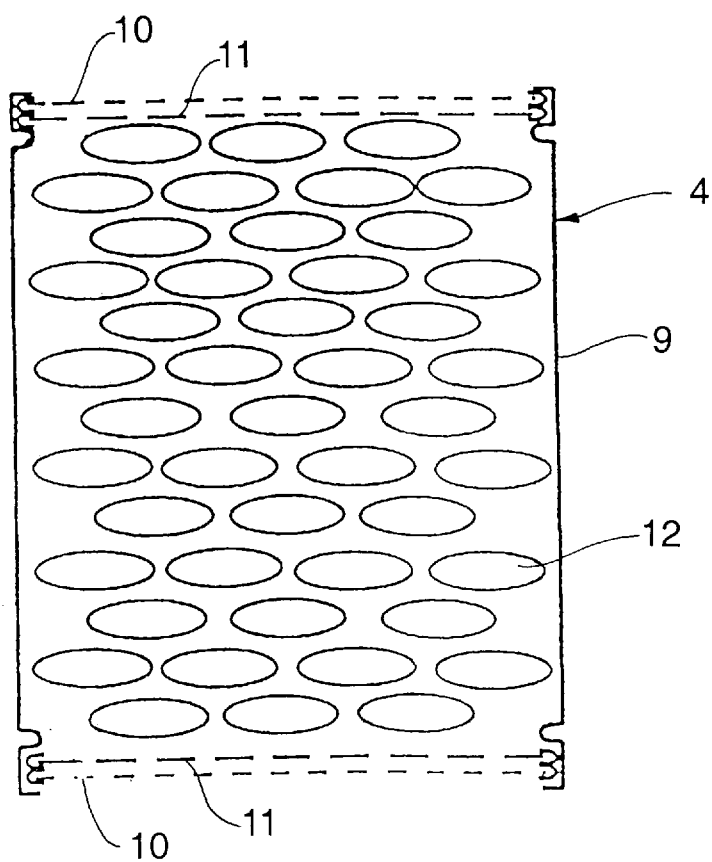
Figure 3:
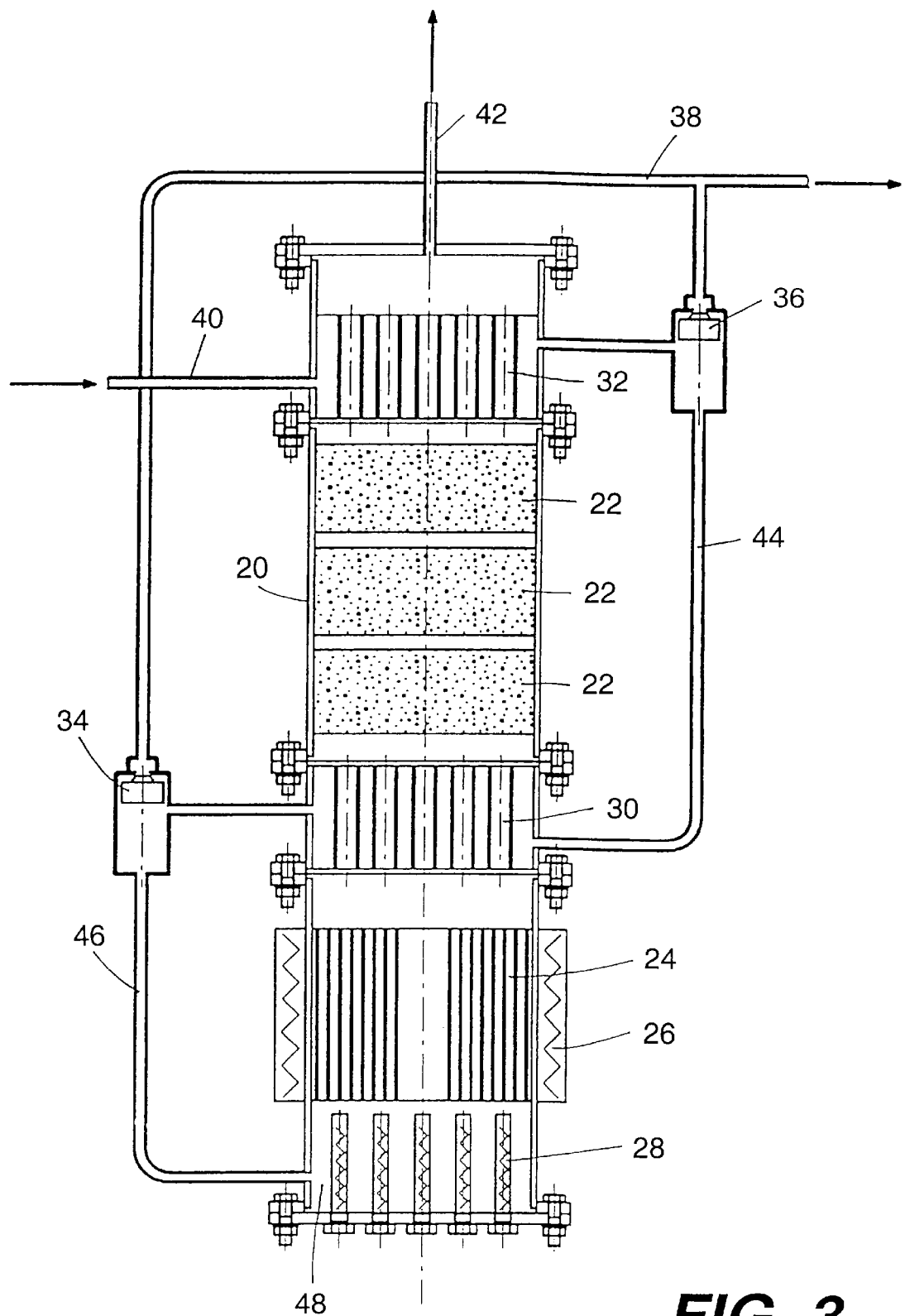

Exemplary embodiments of the invention will be explained in detail below by means of the enclosed drawings. Shown are in:

FIG. 1, a longitudinal sectional view of a device for treating engine fuel;

FIG. 2, a longitudinal sectional view of one of the reactor elements of the reactor in accordance with FIG. 1, and FIG. 3, a longitudinal sectional view of a device similar to FIG. 1 with an upstream-connected catalyzer.

The reactor represented in FIG. 1 has a housing 1 with an inlet opening 2 at the lower end in FIG. 1. At that place there is a heating device 3, for example in the form of PCT elements, in the interior of the reactor housing 1 which, without an elaborate control, provides the heating of the engine fuel flowing into the reactor housing 1 through the inlet 2 to a defined temperature of 70° C., for example. The heating device 3 could also alternatively be operated by means of a heating fluid heated in the engine or a heater.

In the example, two reactor elements 4 have been, inserted in series behind each other into the reactor housing 1. A fine screen 5 is located downstream thereof in the flow direction, which closes off the treatment chamber in the reactor housing 1 at the top in FIG. 1. The reactor elements 4 are sealed in respect to the reactor housing 1 by means of circumferential seals 6 and 7 in the treatment chamber in such a way, that no flow gap is created at the circumference. Thus the fuel is forced to flow from the inlet opening 2 through the reactor elements 4 to an outlet opening 8 at the upper end of the reactor housing in FIG. 1.

FIG. 2 shows one of the reactor elements 4 of the device in FIG. 1 on an enlarged scale. It consists of a can-shaped envelope 9 and respectively two screens 10, 11 at the lower and upper front ends in FIG. 2. The two screens 10, 11 differ in their mesh size, which is coarse in the screen 11 and fine in the screen 10. For example, with the screen 11 it can be 0.5 to 3 mm, and with the screen 10 0.01 to 0.15 mm. The interior chamber delimited by the envelope 9 and the screens 10, 11 is filled with granular reactor particles 12 which have a lozenge-like shape in the exemplary case represented. They consist of an alloy with 80 to 99.8% tin and 0.2 to 20% copper. Their largest dimension, i.e. their greatest diameter, is approximately 1 to 5 mm. The granules or reactor particles are in a loose bulk form in the envelope 9. Following their insertion, they are preferably first dipped into an organic acid, for example formic, acetic or oxalic acid, for the removal of oxides, and then into heating oil or gasoline. The reactor elements 4 are ready for storage and installation after this pretreatment.

In a practical embodiment, the reactor housing 1 has an interior diameter of 70 mm and a length of 200 mm. The inlet and outlet openings have a clearance of 10 mm. The heating device 3 with PTC heating elements reaches a maximal temperature of 120° C. and has a heat output of 140 W. The envelope 9 of the reactor elements 4 consists of aluminum. Its exterior diameter is 66 mm and its length 45 mm. The flat reactor particles 12 consist of an alloy of 96 weight-% of tin and 4 weight-% of copper and they have a diameter of 3 mm. The mesh width of the inner screen 11 is 1 mm and the one of the screen 10 0.08 mm. The still finer screen 5 in front of the outlet opening 8 has a mesh width of 0.04 mm. Prior to their installation in the reactor housing 1, the reactor elements 4 have been successively dipped in acetic acid and then Diesel oil. Three reactor elements 4 are provided behind each other in the practical embodiment. The seal 6, 7 between the envelopes 9 and the reactor housing 1 are seal rings made of caoutchouc, which have an exterior diameter of 70 mm and an interior diameter of 65 mm.

In connection with an exemplary embodiment not shown in the drawings, the diameter of the granules or reactor particles 12 is only 0.5 mm. They have a core made of copper and their surface has been covered with tin by vacuum evaporation. Since a tin-copper alloy has a lower melting temperature as respectively copper and tin by themselves, the desired alloy on the surface of the copper core results during the vacuum evaporation of tin and with at least heating the surface of the copper cores to a temperature slightly below the melting temperature of tin. The granules produced in this manner are suitable for sintering. In this way it is possible to produce porous blocks which can be inserted, with or without an envelope 9, into a reactor housing 1 by means of seal rings 6, 7. Prior to installation it is also possible to perform rinsing in an organic acid and subsequently with gasoline or Diesel oil. As a whole, the production process is somewhat more expensive than the one for reactor elements 4 with loose bulk fill in accordance with FIG. 2, but because of the smaller granules with smaller exterior dimensions of the reactor element, the same effective surface is achieved as with the reactor elements 4 in loose bulk fill. When using sinter blocks as reactor elements it is therefore possible for the tube-shaped reactor housing 1 to have an interior diameter of, for example, only 44 mm and a length of 150 mm. Inlet and outlet openings with a clearance of 6 mm are provided. The heating device 3 again contains PTC heating elements with a maximum temperature of 120° C., wherein the heater output in this case is 45 W. Only two reactor bodies in the form of the said sinter blocks are provided.

In a reactor which in respect to the last mentioned exemplary embodiment is modified, the two reactor bodies consist of an aluminum cover with an outer diameter of 40 mm and a length of 35 mm with a filling which respectively consists of a sinter block obtained from tin and copper oxide particles of approximately 0.3 mm diameter. In this case the weight ratio of tin oxide to copper oxide was approximately 98 to 2. The material was sintered at 1,000° C. and shows a water absorption of approximately 30%. The sinter blocks were surface-reduced in a hydrogen flow at 300° C. for 30 min. The reactor particles were subsequently successively dipped in acetic acid and gasoline prior to their installation.

The device represented in FIG. 3 contains a reactor consisting of three reactor elements 22 in a multi-piece housing 20. As in the exemplary embodiments of FIGS. 1 and 2, the reactor elements 22 can respectively contain a loose bulk fill of a granular reactor material, consisting of a tin-copper alloy with the above recited alloy proportions in an envelope and between screens at the ends. However, the reactor elements 22 can alternatively also be sinter blocks which, for example, consist of copper granules on which tin has been placed by vacuum evaporation and which have then been sintered. These sinter blocks can be inserted either directly into the housing 20, or first into envelopes which are then inserted into the reactor housing 20.

In the flow path of the rapeseed oil to be treated, a catalyzer 24 is arranged in series with and upstream of the reactor elements 22 in the flow direction. The catalyzer 24 is a honeycomb catalyzer made of cordierite coated with $LaCoO_3$, and is used for cracking the long molecular chains of the rapeseed oil and for reducing its oxygen content. During operation it is heated to a temperature of approximately 400° C. by means of a heating device 26 disposed on it. Furthermore, a heating device 28 with a plurality of PTC heating elements is provided upstream of the catalyzer 24 in the flow direction. In addition, the device represented in FIG. 3 has a first heat exchanger 30 between the catalyzer 24 and the reactor elements 22, and a second heat exchanger 32 downstream of the reactor elements 22 in the flow direction.

On their outlet sides, the heat exchangers 30 and 32 are connected to respective steam evaporators 34 or 36, which are each connected with a steam line 38 leading to an air aspiration line of a burner, not shown.

In the device represented, the rapeseed oil or another oil obtained from plants is introduced into the heat exchanger 32 through a feed line 40 and therefore absorbs heat from the finished treated heating oil flowing out of the reactor elements 22 and then, after flowing through the heat exchanger 32, via a line 42 to the burner, not shown.

The rapeseed oil, already preheated in the heat exchanger 32, is conducted via a line 44 on which the steam separator 36 is arranged, to the even hotter heat exchanger 30 between the catalyzer 24 and the reactor elements 22. The rapeseed oil, which is still further heated there, leaves the heat exchanger 30 via a line 46 on which the steam separator 34 is disposed, which is also connected with the line 38 for removing the steam formed in the heat exchanger. The line 46 conducts the rapeseed oil or other crude oil into a reservoir 48 of the honeycomb catalyzer 24, in which the heating device 28 still further heats the crude oil preheated in the heat exchangers, before it enters the catalyzer 24. Because of heating by means of the additional heating device 26, the crude oil in the catalyzer 24 reaches a temperature of approximately 400° C. In the process, the long molecular chains of the crude oil are cracked and the oxygen content reduced. The still hot oil treated in this manner is subsequently cooled in the heat exchanger 30, but still has a temperature of, for example, 200° C. when entering the reactor elements 22. The reactor generates a sufficient number of ignition nuclei in the fuel oil so that, when it leaves the reactor housing 20 via the line 32 after having flowed through the heat exchanger 32, it is suited for sufficiently clean burning or as an engine fuel.

We claim:

1. A device for the treatment of engine and heating fuels obtained from mineral oil or plants, comprising a heating device for heating the fuel, and a reactor through which a flow of fuel can pass, said reactor containing at least one reactor element having a tin alloy on its surface, said tin alloy on the surface of the reactor element containing primarily tin and containing from 0.2 to 20 weight-% of copper as the alloy element with the largest proportion by weight added to the tin, said reactor element comprising a plurality of granules which are loose or which are attached to each other and which have a diameter of at most 5 mm.

2. The device in accordance with claim 1, wherein the tin alloy consists essentially of tin and 0.2 to 20 weight-% of copper.

3. The device in accordance with claim 1 or 2, wherein the copper content of the tin alloy is approximately 2 to 8 weight-% of the tin alloy on the surface of the reactor element.

4. The device in accordance with claim 3, wherein the copper content of the tin alloy is approximately 4 to 5 weight-% of the tin alloy on the surface of the reactor element.

5. The device in accordance with claim 1 or 2, wherein the reactor element comprises a loose bulk fill of said granules.

6. The device in accordance with claim 5, wherein the reactor element comprises a can-shaped envelope having end walls, each of said end walls comprising a screen having a mesh size which is less than the greatest transverse dimension of the smallest granules.

7. The device in accordance with claim 6, wherein at least one of said end walls comprises an inner screen of relatively larger mesh size and an outer screen of relatively smaller mesh size.

8. The device in accordance with claim 7, wherein the inner screen has a mesh size between 0.5 and 3 mm, and the outer screen has a mesh size between 0.01 and 0.15 mm.

9. The device in accordance with claim 6, wherein said reactor comprises an outer housing and wherein said can-shaped envelope is sealed within said outer housing.

10. The device in accordance with claim 1 or 2, wherein the reactor element comprises granules having a largest transverse dimension of approximately 0.05 to 1 mm, said granules being sintered together into a block.

11. The device in accordance with claim 1 or 2, wherein the granules have an inner core bearing a layer of said tin alloy.

12. The device in accordance with claim 11, wherein said core comprises tin oxide or copper oxide.

13. The device in accordance with claim 1 or 2, wherein said heating device PTC heating elements.

14. The device in accordance with claim 11 wherein said core comprises copper.

15. Apparatus for supplying fuel to a burner or an engine comprising a conduit for supplying fuel to a burner or an engine, and a device for treatment of fuel supplied through said conduit, said treatment device comprising a heating device for heating the fuel, and a reactor through which a flow of fuel can pass, said reactor containing at least one reactor element having a tin alloy on its surface, said tin alloy on the surface of the reactor element containing primarily tin and containing from 0.2 to 20 weight-% of copper as the alloy element with the largest proportion by weight added to the tin, said reactor element comprising a plurality of granules which are loose or attached to each other and which have a diameter of at most 5 mm.

16. Apparatus according to claim 15 further comprising a catalyzer in said supply line upstream of said fuel treatment device.

17. Apparatus according to claim 16 further comprising a first heat exchanger located downstream of said reactor and a further heat exchanger located between said catalyzer and said reactor for preheating fuel in said fluid supply conduit downstream of said catalyzer.

18. The device in accordance with claim 16, wherein said catalyzer is disposed between the heating device and the reactor.

19. The device in accordance with claim 16, comprising a further heating device for heating said fuel to a temperature of approximately 400° C. during operation.

20. The device in accordance with claim 16, wherein the catalyzer comprises a honeycomb-shaped support body of cordierite, which is coated with a catalytic material and through which fuel can flow.

21. The device in accordance with claim 20, wherein the catalytic material comprises $LaCoO_3$.

22. A method of treating a liquid hydrocarbon fuel comprising heating the fuel to a temperature of at least 40° C., and contacting the heated fuel with a plurality of granules which are loose or attached to one another and which have a diameter of at most 5 mm, said granules having a tin alloy on their surfaces, said tin alloy containing primarily tin and containing from 0.2 to 20 weight-% of copper as the alloy element with the largest proportion by weight added to the tin.

23. A method according to claim 22, wherein the tin alloy consists essentially of tin and 0.2 to 20 weight-% of copper.

24. A method according to claim 23, wherein the fuel comprises gasoline and wherein the gasoline is heated to a temperature of from 40° to 80° C.

25. A method according to claim 23, wherein the fuel comprises gasoline and wherein the gasoline is heated to a temperature of from 50° to 200° C.

26. A method according to claim 22, wherein said liquid hydrocarbon fuel is obtained by catalytic cracking an oil at a temperature of about 400° C.

27. A method according to claim 26, wherein said oil comprises a plant oil.

28. The device in accordance with claim 22, wherein at least one of said heat exchangers is provided with a steam separator having an air aspiration line.

* * * * *